UNITED STATES PATENT OFFICE.

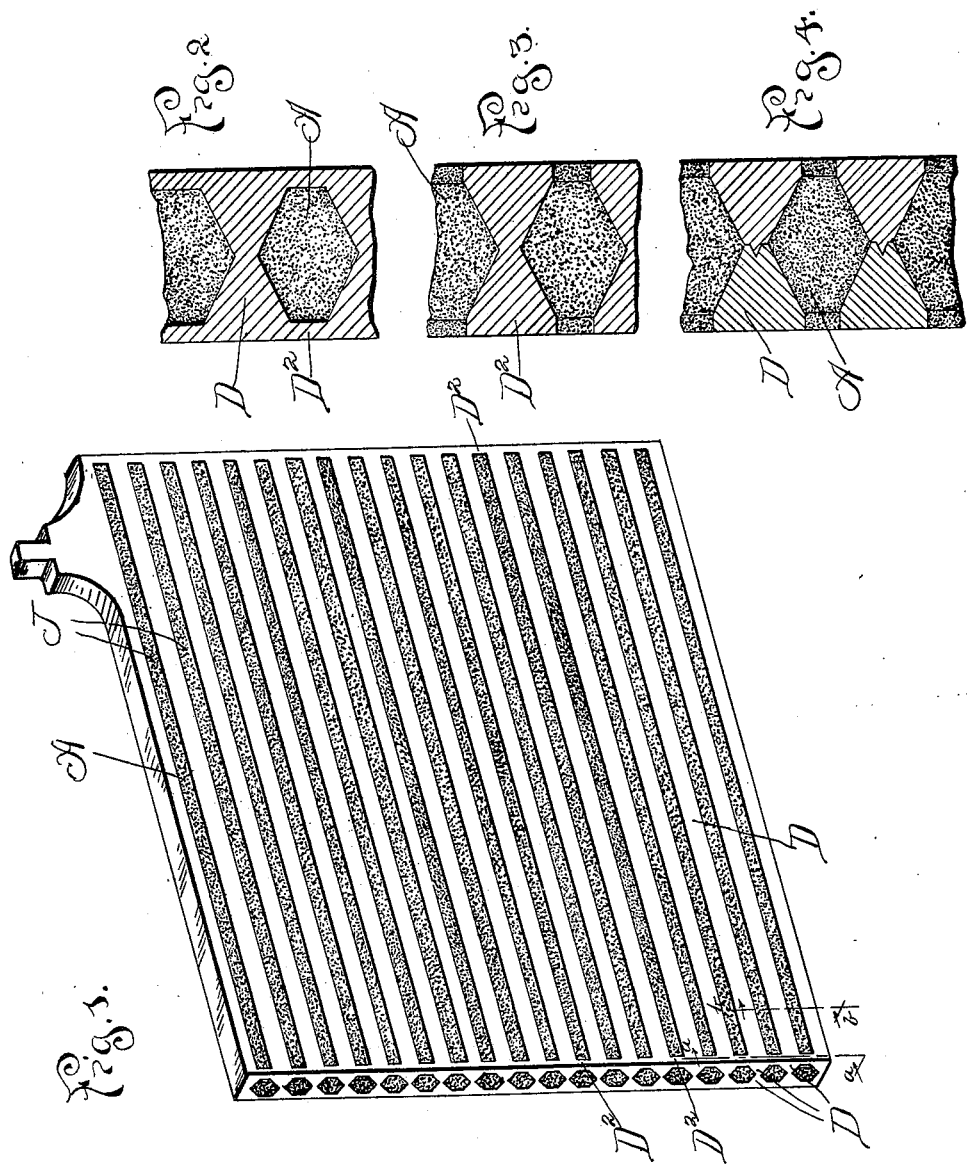

HENRY C. PORTER, OF CHICAGO, ILLINOIS, ASSIGNOR TO OWEN H. FAY, OF SAME PLACE.

SECONDARY BATTERY.

SPECIFICATION forming part of Letters Patent No. 658,865, dated October 2, 1900.

Application filed December 27, 1898. Serial No. 700,319. (No model.)

*To all whom it may concern:*

Be it known that I, HENRY C. PORTER, a citizen of the United States of America, and a resident of Chicago, Cook county, Illinois, have invented a certain new and useful Improvement in Secondary Batteries, of which the following is a specification.

My invention relates to that particular type of electrical secondary or storage battery which is generally designated as the "Fauré" type, in which a lead oxid is employed as an active material or material to become active.

In an electrical storage battery plates of lead are employed, one of which is of a higher potential than the other, and by means of which, in conjunction with a proper solution, an electric current is stored for use. The two types of storage battery which are well known are designated, respectively, as the "Planté" and the "Fauré" type. In the former the electrode or plate of the storage-battery element consists of metallic lead, which is treated with a current in order to transform it into an active element. This treatment, as is well known, consists in passing a current of electricity reversely and repeatedly through the metallic lead with intervals of rest. In the latter type of storage-battery element to which my invention relates a grid of metallic lead is employed, to which the lead oxid in the form of a paste is mechanically applied.

In storage-battery elements of the Fauré type much difficulty is encountered in providing means for holding the red lead, or rather the active material or material to become active, in proper position upon its support. When the electrode, with its mechanically-applied material, is subjected to the influence of an electric current, in the charge the metallic grid or support of the material is subjected to great strain, causing warping and buckling, which tends to disintegrate the material and dislodge it from the support. This causes the active material or material to become active to accumulate upon the bottom of the cell to produce short-circuiting and also frequently causes the active material or material to become active to form a conducting-path from one electrode to the other, thus short-circuiting the element. In holding the active material or material to become active in place it is essential to provide free and open places through which the electrolyte may find free circulation to attack and act upon the active material or material to become active.

My invention has for one object the provision of means whereby the active material or material to become active shall be more affected and firmly secured and held against dislodgment in the electrode under the influences of the charge and discharge and also to afford means for the free circulation and penetration of the electrolyte in and upon the outer and subjacent exposed surfaces of the active material or material to become active.

My invention has certain further objects in view; and it consists in certain features about to be described, reference being now had to the accompanying drawings, in which—

Figure 1 is a perspective view of an electrode complete in itself of my improved type. Fig. 2 is an enlarged cross-sectional view on the line $a\,a$ of Fig. 1 of the fragment, showing the channels in the grid for holding the active material or material to become active. Fig. 3 is a like view on the line $b\,b$ of Fig. 1. Fig. 4 is a like view of a modified form.

The grid of metallic lead, which constitutes the support and container for the active material or material to become active A, is designated at B. This grid is made up of a plurality of parallel strips or bars of metallic lead V-shaped on their opposite faces (designated at D) on either side of the electrode. These bars or rods D are connected and joined together by means of the end-connecting strips $D^2$. Thus long channels or pockets are formed of the particular shape shown in the sectional views, which are adapted to receive and contain the active material or material to become active. This material may be mechanically applied to the interiors of the pockets and packed therein by any suitable means. It is evident that when so introduced and held in the pockets the material will be vertically supported and yet exposed to a maximum extent for the action of the electrolyte thereon. This penetration is effected because of the long spaces J between the bars or rods D.

In Fig. 4 I have shown a form in which the rods or bars D are severed at the point of juncture centrally of the electrode.

In order to expose to the action of the electrolytic fluid the maximum surface of active material without danger of the same falling out of the pockets in the grid, I have shown the horizontal connecting-strips $D^2$ at the ends of the bars D as perforated opposite the space between the bars, such openings substantially corresponding in shape and dimensions with the openings between the bars, thus affording a considerable additional surface exposed to the action of the electrolytic fluid without any increased liability to the dislodgment of the active material.

Having thus described my invention, what I claim as new therein, and desire to secure by Letters Patent, is—

A secondary or storage battery electrode comprising a grid composed of a plurality of bars having V-shaped grooves in the opposite faces thereof so as to form pockets therebetween, end bars connecting said plurality of bars and provided with perforations therein registering with the spaces between said grooved bars and active material packed within said grooves and the openings in the end bars, substantially as described.

Signed by me, at Chicago, Cook county, Illinois, this 21st day of November, 1898.

HENRY C. PORTER.

Witnesses:
CHAS. C. BULKLEY,
L. M. BULKLEY.